United States Patent [19]

Pick et al.

[11] 4,405,960
[45] Sep. 20, 1983

[54] MAGNETOGRAPHIC RECORDING HEADS

[75] Inventors: George G. Pick, Mendham; Houshang Rasekhi, Convent Station, both of N.J.

[73] Assignee: Wang Laboratories, Inc., Lowell, Mass.

[21] Appl. No.: 268,934

[22] Filed: Jun. 1, 1981

[51] Int. Cl.³ .............................................. G11B 5/16
[52] U.S. Cl. ................................... 360/125; 360/123; 360/126
[58] Field of Search ................. 360/123, 122, 125–126

[56] References Cited

U.S. PATENT DOCUMENTS 3,349,382 10/1967 Naylor et al. ....................... 360/123
3,626,396 12/1971 Eastman et al. .................... 360/123
3,781,476 12/1973 Hanazono et al. .................. 360/123
4,025,927 5/1977 Nelson ................................. 360/123

FOREIGN PATENT DOCUMENTS 705509 12/1979 U.S.S.R. .............................. 360/123

Primary Examiner—John H. Wolff
Attorney, Agent, or Firm—Michael H. Shanahan; Joseph E. Funk

[57] ABSTRACT

Improved recording head structures having lower recording current requirements and planar construction which are mass-producible with high reliability. Associated with the conductors constituting the recording elements are one or more selected materials, predeterminably situated, for substantially reducing the reluctance of the magnetic writing circuit associated to the conductor recording zone. The material is arranged to at least partially define the recording zones and to shield the recording medium from the magnetic fields associated to the recording elements outside of the recording zones. Through appropriate choice and placement of such material, a pre-biasing effect may be achieved thus enabling further reduction in recording currents.

4 Claims, 12 Drawing Figures

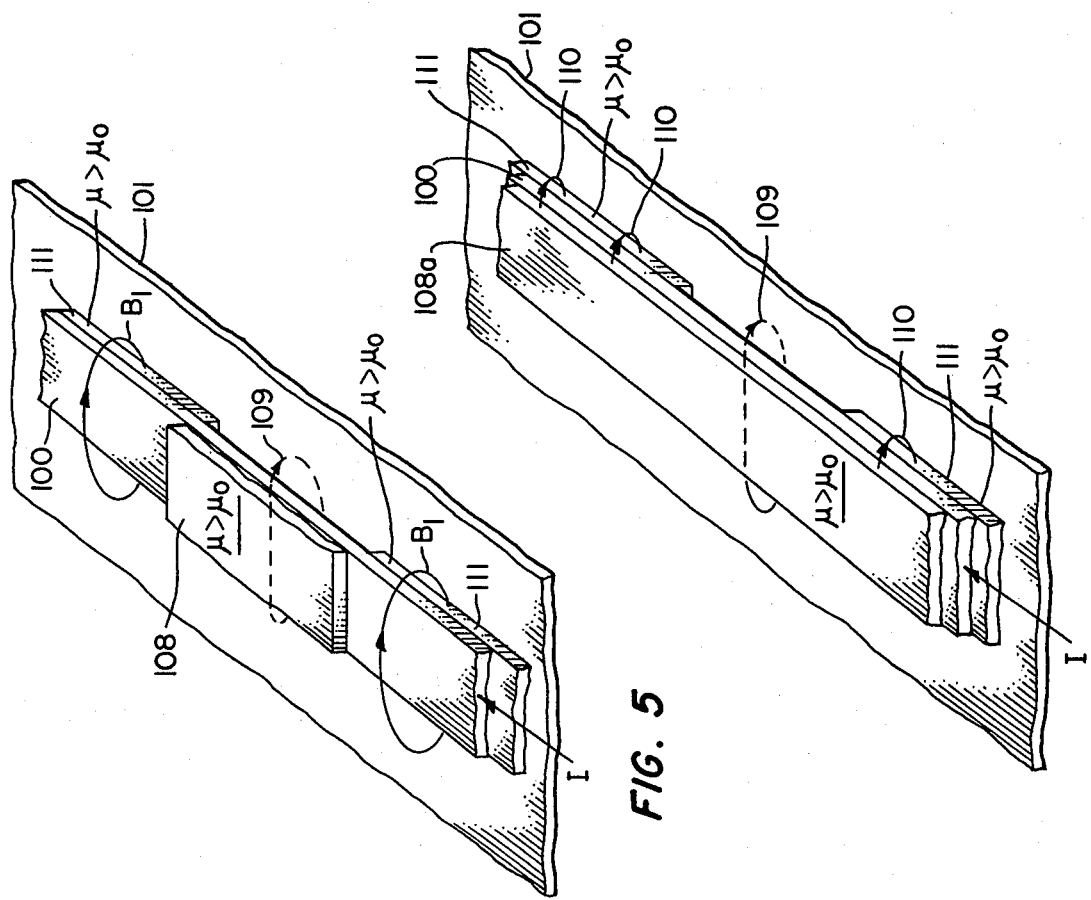
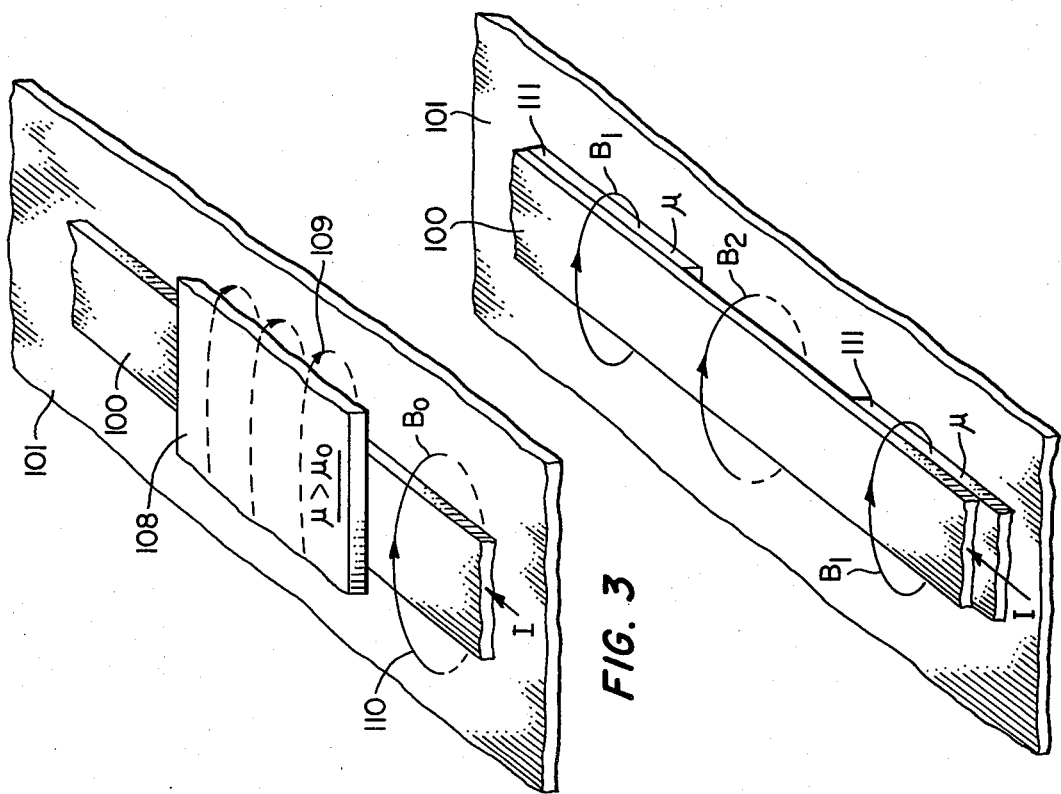

MAGNETOGRAPHIC RECORDING HEADS

BACKGROUND AND SUMMARY OF THE INVENTION

This invention relates to recording heads in magnetographic printing and more specifically to recording head arrangements and fabrications enabling the use of substantially lower write currents and flat construction, which improve reliability, speed of recording and cost effectiveness, as well as lend themselves to mass-producibility. This invention in particular relates to improvements in the recording head design described in U.S. Pat. No. 4,025,927 to A. Nelson, the subject matter of which, in so far as it is pertinent to this invention, is incorporated by reference herein.

Although the recording scheme of the above-mentioned patent lends itself to the design and fabrication of recording heads having a multiplicity of recording elements of very fine structure capable of highly articulate recording, wherein such fabrication could utilize the so-called "etch foil" technology as described in said patent, such a recording head normally requires relatively high recording current to effect satisfactory magnetic recordings. The requirement of relatively high recording current leads to several engineering design concerns.

The first deals with the generation of possibly destructive heat at and near the recording zone when recording at high speeds. As such, a reduction in the electrical resistance of the individual recording elements would be appropriate.

The reduction of the electrical resistance of the recording elements leads to a second concern, namely an increase in the circuit time constant, L/R, which in turn reduces the recording speed. To overcome this, one is led to utilize sophisticated and/or inefficient driving schemes.

A third concern involves the need for large and relatively expensive driving components providing the high recording current. In addition to increased expense, the large driving components create packaging and other problems, especially for wider recording head designs.

Furthermore, to define the recording zone Nelson requires the creation of a physical virtually square notch in each of the recording elements. To achieve a well defined recording zone, the height of this notch must be relatively large as compared with the width of the recording elements, in the vicinity of the recording zone (e.g. in a recording head with 250 recording elements per inch, the height of the notch typically would be approximately $1.5 \times 10^{-3}$ in. and the width of recording element is $2 \times 10^{-3}$ in., with a typical recording zone length being on the order of $3.5 \times 10^{-3}$ in.). In high resolution recording heads, creation of this notch, within such specifications, can become quite difficult in terms of mass production and, therefore, is of concern.

What is desired is an improved recording head arrangement capable of highly articulate recording with substantially smaller recording currents, and such is a principal objective of this invention.

What is also desired is an improved recording head arrangement having virtually flat construction and high recording zone definition and yet readily lends itself to mass producibility, and such is another principal objective of this invention.

The above-mentioned concerns and are solved in accordance with the improved method and apparatus of this invention for magnetic recording on a magnetizable medium wherein there is provided adjacent to at least one major surface of each current-carrying conductor constituting a write element of a recording head, at the recording zone of said element, a material which effects a substantial reduction in the reluctance of the magnetic circuit associated to the recording zone of said conductor.

Thus there is provided by the present invention a multi-channel magnetic recording head in which each channel includes a conductive writing element having a recording zone, wherein the writing elements consitute a plurality of elongated conductor strips each substantially parallel to one another and having predetermined width and thickness at least in the recording zone associated thereto, with each said conductor strip having a first surface arranged for facing a magnetizable recording medium and also a second surface, wherein a relatively high permeability, high magnetically saturable material (i.e. a material having a high magnetic saturation level or density) is contiguous to the second surface of each conductor strip at the recording zone.

In accordance with the invention it is particularly advantageous to further define the recording zone associated to each of the recording elements of the recording head. In connection therewith the invention provides an improved method of recording on a magnetizable medium via at least one current-carrying conductive element having a recording zone associated thereto, wherein the improvement comprises reducing the magnetic circuit reluctance outside the recording medium around said conductor at least at the recording zone wherein the reluctance is reduced by placing a relatively high permeability, high magnetically saturable material adjacent to at least the surface of the conductive element which faces the recording medium and other than at the recording zone.

An example of high permeability, high magnetic saturation material suitable for use in accordance with the present invention is an epoxy carrier with a pigment of of carbonyl iron (e.g. GAF product SF8). An alternative suitable material would be the Emerson & Cuming product CR124.

Further in accordance with the invention there is provided a flat, planar type articulate structure which can be constructed for example by metalization techniques utilized in fabricating large current integrated circuits, and thus is mass-producible with high reliability. In addition, the recording head area encompassing the recording zones of each of the recording elements can be as thin as a few microns and thus could be as much as fifty times as wide (or long) as it is high (or thick). This is in contrast, for example, to the recording head of the aforementioned Nelson patent, in which a notch is required which is roughly half the width or length, or even equal to the width or length, of a recorded pixel, i.e. a few mils wide.

In addition to the present invention effecting a substantial reduction in the recording current utilized in the conductive recording elements, the need is obviated for a geometric shift of the current flow path at the record zone toward the recording medium to articulately define the recording zone of each recording element. The present invention achieves a highly articulate shift in the magnetic field around the current-carrying conductor constituting the recording element, in localizing the recording function thereof without for example the notch construction depicted in the aforementioned patent.

Moreover, in constructing planar recording elements in accordance with the present invention, smaller "writing gaps" or recording zones, i.e. the portion of the conductive recording elements generating sufficient magnetizing field to effect recording on a magnetizable medium, are readily realizable, providing substantially sharper magnetic field intensity transitions and leading to higher resolutions. An additional advantage of recording heads constructed in accordance with the present invention is that the recording medium may now be situated very close to the recording elements of the recording head.

A further advantage of the present invention is that with thin film metalization construction techniques, one can with great accuracy selectively place regions of magnetic thin film behind the conductors, i.e. the major surface of the current-carrying recording element facing away from the recording medium (which is the surface normally attached to or otherwise contiguous with a support material or substrate usually in the form of a mandrel).

An additional feature of this invention is the capability of the material placed at the recording zone to provide a pre-biasing magnetic effect. By this the recording function is augmented locally; as such, this leads to a reduction in the recording current needed. More particularly, the material behind the recording element at the recording zone may be a relatively hard magnetic material (i.e. having a relatively high magnetic remanence as well as relatively high magnetic saturability), such as iron oxide. To derive the pre-biasing effect, one need only apply an initial current in each conductive element of sufficient level and duration to effectively achieve a saturation of the magnetic material behind said conductors at the recording zone, whereby local magnetization of said material occurs. Thereafter, whenever the conductive element is energized, this local premagnetization will assist in the recording function, although by itself the pre-biasing magnetic field is insufficient to effect a recording on the magnetic medium. As a result, lower recording current may be employed in the recording elements to effect satisfactory recording on the recording medium.

BRIEF DESCRIPTION OF THE DRAWINGS

The above-mentioned and other objects and features of this invention will become better understood by reference to the following detailed description, taken in conjunction with the accompanying drawings, in which:

FIG. 3 illustrates in an enlarged perspective view a planar construction of a recording element having a high permeability material positioned behind the recording element at the recording zone in accordance with the invention;

FIG. 4 illustrates in an enlarged perspective view a planar arrangement of a recording element in which high permeability material is placed on the side of the recording element facing the magnetizable medium other than at the recording zone, in accordance with the invention;

FIG. 5 illustrates in an enlarged perspective view a planar arrangement of a recording element combining the features of FIGS. 3 and 4;

FIG. 6 illustrates in an enlarged perspective view a recording element construction similar to that of FIG. 5 wherein the material backing extends beyond the recording zone;

DETAILED DESCRIPTION

Figure 1A:
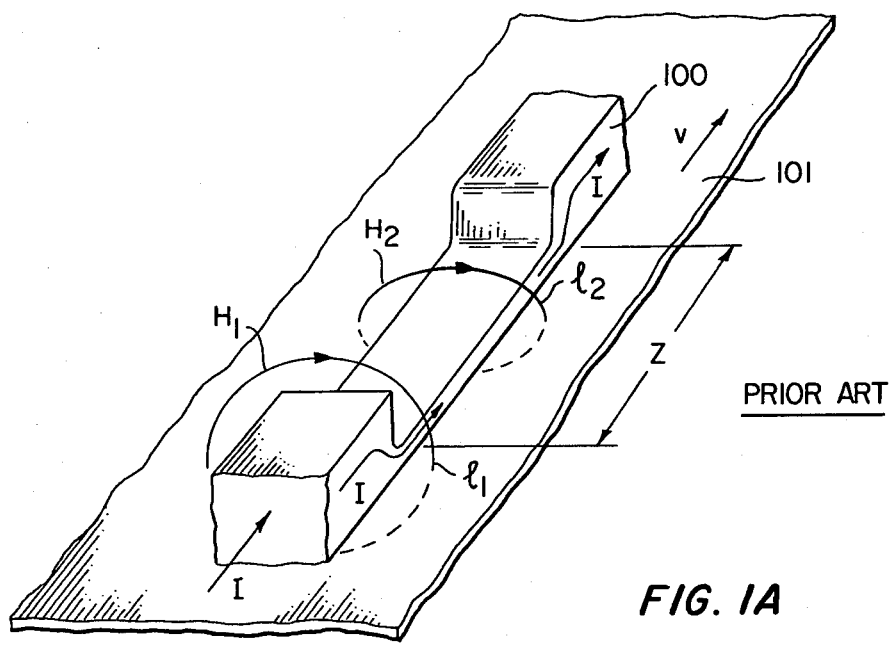
FIG. 1A is an enlarged perspective conceptual illustration of a single current-carrying recording element of the recording head depicted in the aforementioned Nelson patent.

FIG. 1A depicts the Nelson Patent magnetic recording scheme for magnetography. A single illustrated recording element 100 is positioned above a magnetic recording medium 101 that is moving with a velocity of v in the direction indicated. To effect the recording of a pixel (magnetic zone) an electric current pulse I flows through the recording element 100 generating a magnetic field around the recording element as indicated by relative field lines $H_1$ and $H_2$. The recording element is geometrically thinned down for a predetermined length Z to define the recording zone. This reduction of the recording element at the recording zone causes a stronger magnetic field $H_2$, as compared with $H_1$, to be experienced by the recording medium. This is due to the dual phenomena of bringing the centroid of current closer to the recording medium at the recording zone as well as the geometrical shortening of the field lines at the recording zone in the Nelson head. This phenomenon can be mathematically explained by utilizing Ampere's circuital law which defines the functional relationship between I, H and the length l of the path along which H is measured, in terms of a line integral $$\oint_l \vec{H} \cdot \vec{dl} = I \tag{1}$$

Using this relationship and integrating over the two different paths $L_1$ and $L_2$ in FIG. 1A results in $$H_1 = I/l_1 < < H_2 = I/l_2 \tag{2}$$

where: $l_1$ is the path for constant $H_1$ around the recording element outside of the recording zone and $l_2$ is the path for constant $H_2$ within the recording zone, and where $l_2$ is shorter than $l_1$ although they have similar geometrical relationship with the magnetic medium 101.

Figure 1B:
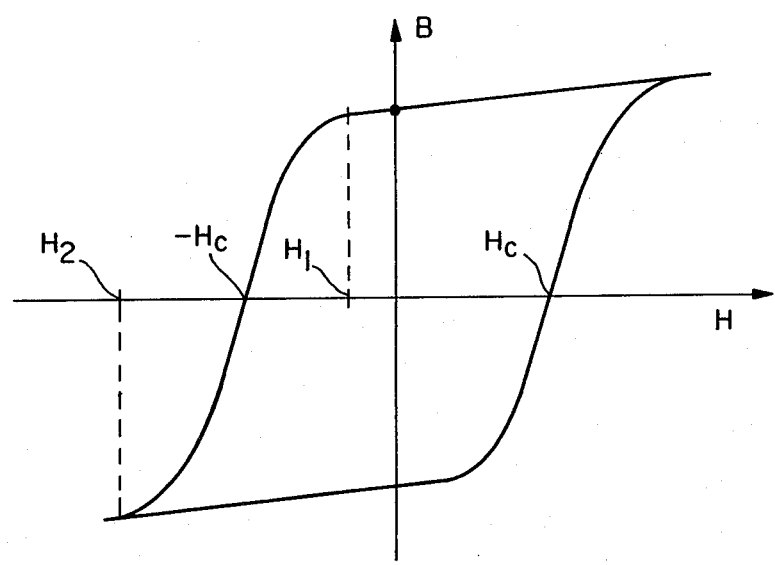
FIG. 1B graphically illustrates the interaction of the magnetic field generated by the current-carrying element of FIG. 1A with the recording medium both at and apart from the recording zone.

The interaction of $H_1$ and $H_2$ of FIG. 1A with a properly selected magnetic medium is illustrated in FIG. 1B. As shown, the magnetic medium has a rather "square" B-H characteristic and has been premagnetized. To effect the recording of a pixel, one needs to preselect a magnitude for I such that $$|H_1| < H_c, \tag{3A}$$

and due to the geometrical configuration of the recording element 100

$$|H_2| > H_c, \tag{3B}$$

where, $H_c$ is the magnetic coercive force corresponding with one of the intrinsic properties of the recording magnetic medium.

Under these conditions, therefore, the (premagnetized) direction of the magnetic field in this magnetic medium is only reversed at the recording zone, thus creating a latent magnetic pixel.

The recording scheme depicted in FIGS. 1A and 1B lends itself to the design and fabrication of recording heads, with many recording elements of very fine structure, and utilizing "etch foil" fabrication technology. However, it requires relatively high recording current I to effect magnetic recording.

Figure 2A:
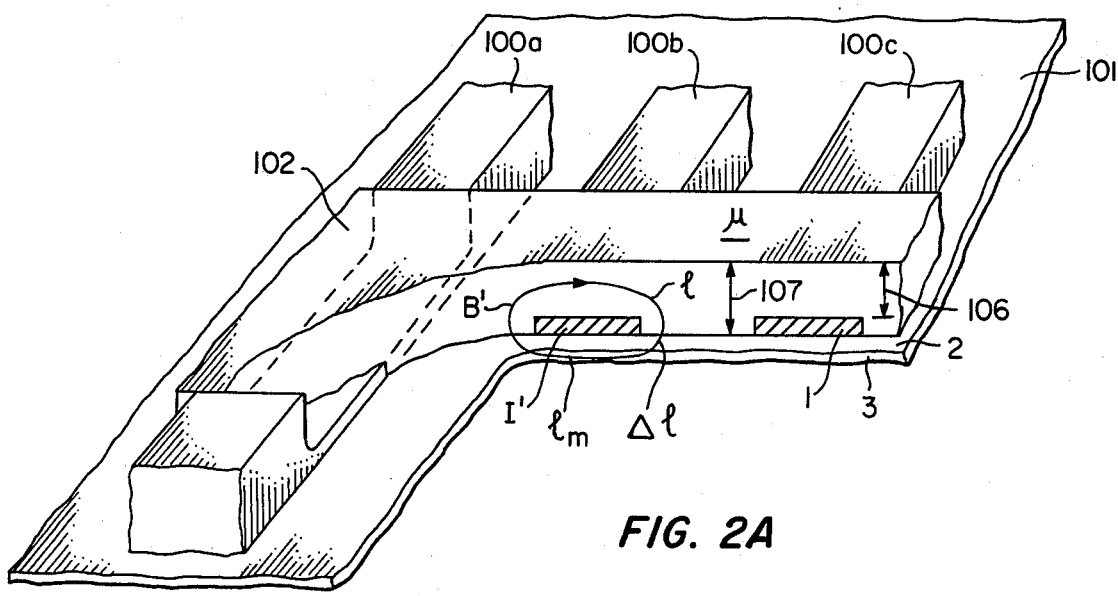
FIG. 2A illustrates in an enlarged perspective view of the recording zone portions of a trio of current-carrying recording elements similar to that of FIG. 1A, in which a block of high permeability, high magnetically saturable material is placed at the recording zones adjacent to the surfaces of the recording elements facing away from the recording medium, in accordance with the invention.

FIG. 2A illustrates an improved recording head in terms of a substantially reduced recording current. The improvement is achieved through the introduction of a body of material 102 with magnetic permeability $\mu$ substantially higher than $\mu_o$ (the permeability of air) into the recording zone.

As shown a single block of material 102 extends from recording element to recording element at the respective recording zones, with the latter forming a straight row. It is to be noted however, that individual portions of material 102 may be provided to each or selected ones of the recording elements.

In FIG. 2A the recording element 100b is excited by the recording current I'. As shown, the resultant magnetic field intensity H is now subjected to a path comprising the path l within the high permeability material 102, the path length $\Delta l$ in air and $l_m$ corresponding with the path length in the magnetic medium 101 itself. Knowing the relation between the induced magnetic field B and field intensity H as given by $$B/H = \mu, \tag{4}$$

and carrying the line integral of formula (4) over the total path shown in FIG. 2A for element 100b, results in $$B'(2\Delta l/\mu_o + l_m/\mu_m + l/\mu) = I' \tag{5}$$

(approximated for the case of B entering the magnetic medium perpendicularly). For the recording head depicted in the Nelson Patent, equation (5) becomes $$B(2\Delta l/\mu_o + l_m/\mu_m + l/\mu_o) = I \tag{6}$$

because l is also in air.

Now, requiring $$B' = B \tag{7}$$

i.e. keeping the same level of magnetic recording field, as is desired, and dividing equation (5) by (6), results in $$I'/I = (2\Delta l + l_m \mu_o/\mu_m + l\mu_o/\mu)/(2\Delta l + l_m \mu_o/\mu_m + l) \tag{8}$$

In this relationship the term $l\mu_o/\mu$ becomes smaller as $\mu$ becomes larger; thus $I'$ becomes smaller than I.

Figure 2C:
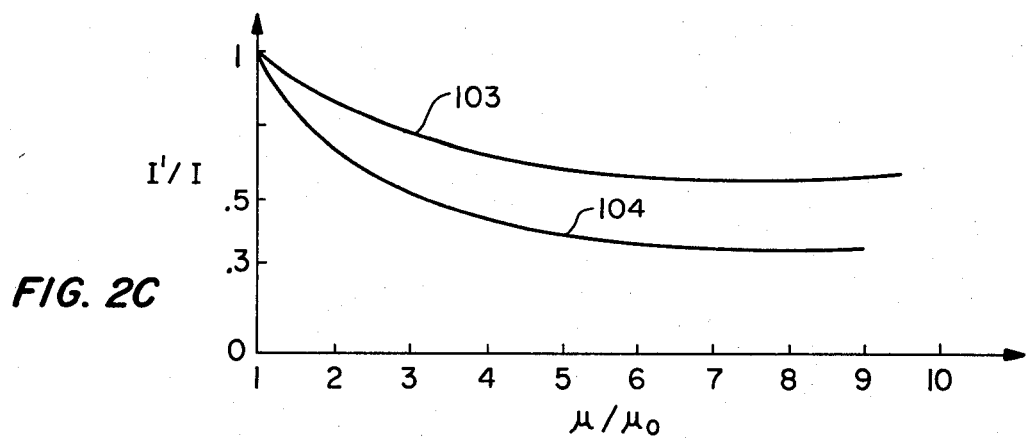
FIG. 2C graphically illustrates the normalized reduction in current realizable from the introduction of the high permeability material at the recording zone as provided by the two different relationships of FIG. 2B.
Figure 2B:
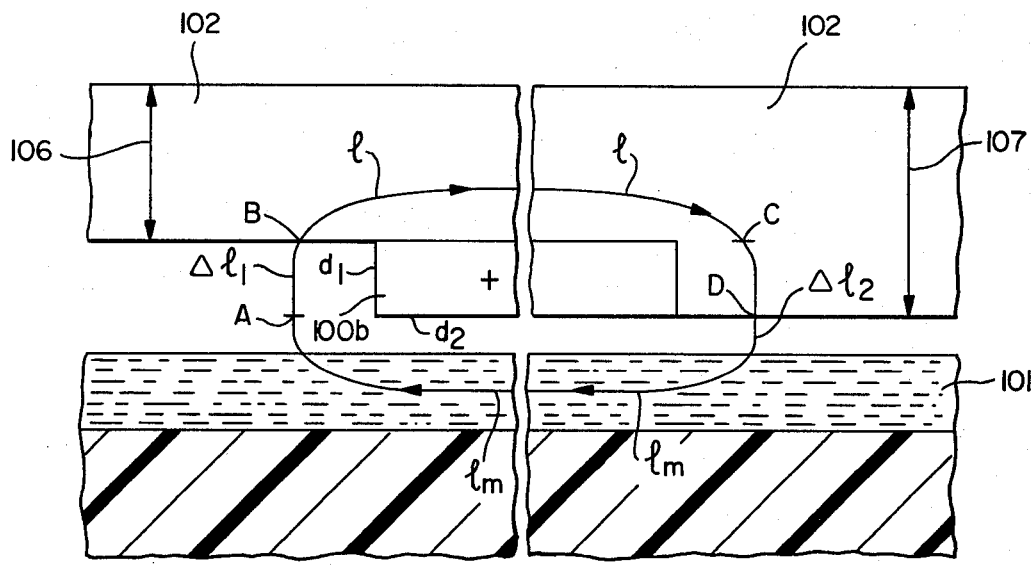
FIG. 2B illustrates in a break-away sectional end view one of the recording elements of FIG. 2A in spaced relationship with the recording medium, in which high permeability material is provided in two different relationships with the recording element.

In FIG. 2B there is illustrated in cross-section the relationship between one of the conductive recording elements of FIG. 2A (e.g. element 100b), the magnetic medium 101 and the material 102. In the one case illustrated, the material contacts the recording element at the surface thereof which is distal to the recording medium, whereas in the other illustrated case, the material surrounds the conductor except for the surface thereof which is proximate to the recording medium. The length $\Delta l_1$ represents the separation gap between material 102 and the medium 101 for the case of the material having a thickness represented by 106, and $\Delta l_2$ represents the gap for a material 102 having a greater thickness, as indicated by 107 (i.e. material 102 in this case extending around the conductor except at the side facing the medium 101). $\Delta l_1$ and $\Delta l_2$ thus respectively represents that length of the illustrated field line around the conductor 100b in air between the medium 101 and the material 102. As before, l represents the length of the field line inside the material 102 and $l_m$ represents the length of the field line inside the magnetic medium 101.

For a recording head with recording elements having cross-sectional dimensions of $d_1 = 0.25$ mils and $d_2 = 2$ mils (FIG. 2B) interacting with $CrO_2$ magnetic medium having the magnetic characteristics depicted in FIG. 1B, the reduction of current in terms of $I'/I$ as a function of $\mu/\mu_o$ is depicted in FIG. 2C. Curve 103 represents achievable reduction of current for a record head with material 102 deposited behind the recording elements to the depth of level 106 (FIG. 2B). Curve 104 corresponds with achievable reduction of current for a recording head with the same material 102 deposited behind and in between the recording elements to the level 107. Typically, the layer 102 may be a magnetic pigmented epoxy having a permeability in the range of 5 to 5.5. As shown, for large values of $\mu/\mu_o$, curve 103 asymptotically approaches the normalized value of 0.5, which suggests up to a 50% reduction in the recording current; moreover, curve 104 approaches the level of 0.3 for large $\mu/\mu_o$, indicating possible current reductions up to 70%. Thus, for currents in the area of thirteen amperes for the arrangement of FIG. 1A, utilization of a high permeability material having thickness level 107 and permeability of say 5.5 would be able to yield a current reduction on the order of 4.8 amps or a resultant recording current of 8.2 amps.

Further improvements in accordance with the present invention are illustrated in FIGS. 3-6. In particular, the recording head arrangements depicted therein require no geometrical change of the recording zone, i.e. no physical change of the plane of current flow relative to the magnetic medium. This allows the design and construction of "flat" record heads utilizing, as example, "etch foil" technology or "metalization" techniques or a combination of these fabrication technologies.

FIG. 3 depicts a single recording element 100 of a recording head positioned on a magnetic medium 101. A high permeability material 108 is deposited behind the recording element 100 in the record zone which shunts the magnetic field represented by field lines 109 in material 108, which enables a substantially higher recording magnetic field as compared with $B_o$, represented in FIG. 3 by field line 110. The recording zone is in this way at least partially defined, and without the need for a geometrical change. In actuality, material 108 can (as shown by the breakaway) be a continuous piece transcending across the entire recording head at the respective record zones of the recording elements. See in this regard FIG. 7 in particular.

FIG. 4 shows an arrangement of a "flat" recording head. In this configuration the high permeability material 111 is deposited on the recording element such that it lies between the magnetic medium 101 and the recording conductor 100. A discontinuity in the material 111 primarily defines the recording zone and allows $B_2$ to interact with the magnetic medium 101. As shown in FIG. 4, the magnetic field $B_1$ outside of the recording zone is shielded away from the magnetic medium 101. The aforementioned discontinuity together with the shielding effect provided by the material 111 thus enables the recording of a pixel at the record zone.

FIG. 5 illustrates a preferred embodiment having the combined features of the record head arrangements shown in FIGS. 3 and 4. As depicted in FIG. 5, the recording zone is defined by the discontinuity in material 111 and the presence of a second section of high permeability material 108, located on the back of the recording element to effect a reduction in the recording current due to its magnetic shunting characteristic. As compared with FIG. 3, in FIG. 5 the interaction of $B_1$ with the magnetic medium is minimized by the shielding effect of material 111. Thus, FIG. 5 represents an especially advantageous recording scheme having "flat" geometry, reduced recording current requirements, and reduced (shielded) magnetic field outside of the recording zone.

FIG. 6 shows that the shunting high permeability material 108 of FIG. 5 can extend beyond the recording zone in either direction. However, it is noted that the extension of 108 to relatively large distances could tend to increase the inductance, L, of the recording elements which in turn would tend to increase the circuit time constant L/R that would lead to reduced recording speed.

Figure 7:
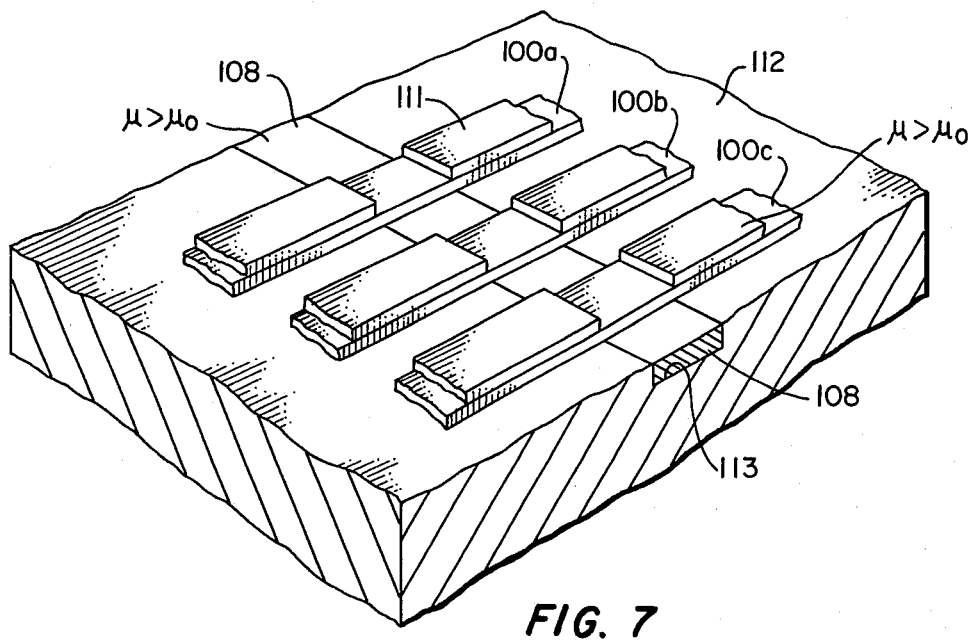
FIG. 7 illustrates in an enlarged perspective view the fabrication of a trio of recording elements in accordance with the arrangement of FIG. 4 on a substrate, wherein the high permeability material backing is situated in a recess enabling flat surface construction.

FIG. 7 shows a portion of a recording head comprising three recording elements, and utilizing the concept shown in FIG. 5. As indicated in FIG. 7, the high permeability material 108 is deposited in a recess or channel 113 provided in a substrate 112. Three flat recording elements 100a, 100b and 100c are formed on the substrate 112, creating a substantially stable and strong planar structure. High permeability material 111 is deposited on the recording elements to minimize interaction of the record head with the magnetic medium outside and beyond the recording zone. In the case where the materials 108 and 111 are electrically conductive, there would be a need for a thin film of dielectric (insulative) material in between the recording element and such material to prevent deviations in the current path.

Figure 8:
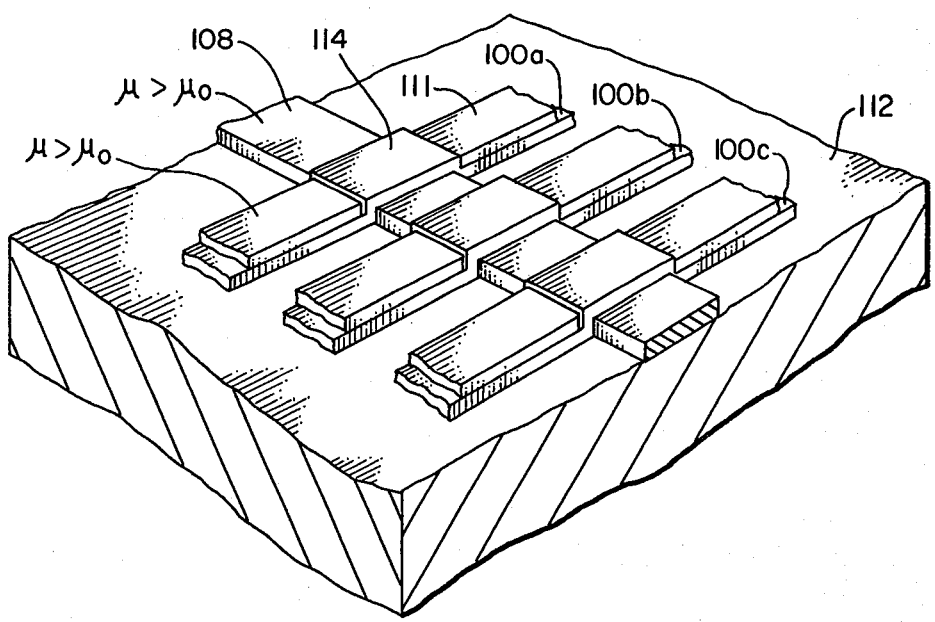
FIG. 8 illustrates in an enlarged perspective view the fabrication of recording elements on a substrate similar to FIG. 7, wherein the high permeability backing material lies on the surface of the substrate.

FIG. 8 depicts a portion of a record head with the material 108 deposited on the substrate 112. In this configuration the recording zone 114 will be closest to the magnetic medium. It should be noted that depositon of high permeability material 108 in between the recording elements in FIG. 7 and FIG. 8 would lead to further reduction in the recording current, in similar manner as illustrated in FIG. 2B.

The invention as particularly illustrated in accordance with FIGS. 3-8 achieves a "shift" in the magnetic field around a conductor such that no substantive geometric shift of the current flow path is required to localize the recording to a given area. This allows the flat, planar head structure, in contrast to, for example, the aforementioned patented work of Nelson, wherein the centroid of current in a conductor with its encircling magnetic field is made to "rise" toward the magnetic tape recording medium so as to increase the field in the medium to levels needed to record at flux densities required for magnetic recording.

Since there is a vast body of technology which is essentially planar relatively speaking (micron thick layers with much wider dimensions) for conductors, semiconductors, magnetic films, insulators, etc., and a vast body of precision deposition and etching technology exists for it, almost all integrated circuit (IC) work can and does take planar form. As a result, a flat head could be mass fabricated, with for example many heads on a slice, as in IC's, or simply a relatively very long single head structure.

Among the principal concepts of the present invention as embodied in FIGS. 3-8, there is included the concept of the magnetic overlay or shield which would allow the conductor to remain essentially in one plane. The magnetic tape contacting distance can then always be close to the conductor without concern of where the conductor paths actually lay.

However, where no recording is desired, the field can be shunted (e.g. FIG. 4) by for example the thin magnetic material layer 111 (soft iron, possibly iron-nickel, etc.) in a shielding action to avoid the field around the conductor from being strong enough to record on the tape medium. In FIG. 4 the conductor and its associated field is thus seen as it exists with and without the thin magnetic film overlay.

The layers of conductor and magnetic overlay or shield can be easily deposited one on top of the other, with a possible intermediate insulating layer, typically of Silicon Oxide, in between, and a silicon slice of common IC thickness such as 10 to 15 mils thick could be used as a substrate, or if no semiconductor is needed, ceramic, glass, coated metals and other substitutes could also be used. The resulting planar structure may be as illustrated in FIGS. 7 or 8. Of course, if material 108 is conductive, an alternative approach to the application of $SiO_2$ would be to provide a very short discontinuity of the material 108 through its thickness in between each of the conductive elements 100.

In the length of the head where recording is desired (the recording zone), the overlay is removed to delineate the longitudinal region where a recording field is to be utilized to cause a recording pattern to be effected on recording medium, as illustrated by the field lines in for example FIGS. 4-6.

The planar technology of using an overlay magnetic thin film enables the recording zone to be developed with substantially greater definition and resolution, e.g. much shorter in the longitudinal direction. In contrast, the conductor is made to rise toward the medium for a typical distance of one to two mils in the patented Nelson head and the articulate capabilities of the Nelson head require that the notch defining the recording zone be sharply edged, to get the same effect. In accordance with the present invention, all that is required is for the thin magnetic layer to be etched away for any required distance, and since this thin magnetic layer is only typically a few micrometers thick, the field along the conductor length can easily reach the magnetic medium and the construction can be considered flat.

In connection with the arrangement of the present invention according to FIGS. 2A–2C, the concept of depositing an extended area of a magnetic powder loaded epoxy adhesive behind the entire head depicted in the Nelson Patent (which uses copper and nickel layered construction) may be seen. As indicated hereinbefore this material minimizes the magnetic reluctance behind conductors so as to reduce the required current therein. This adhesive deposition would not be particularly done on a geometrically selective basis because mechanical means do not readily exist to lay this material just in that area behind the recording zone, since in this particular example the epoxy is also intended to be the adhesive holding the entire assembly to a mandrel or substrate.

The use of a magnetic thin film allows one to readily, selectively and accurately place regions of magnetic thin film behind the conductor, as a shunt, so as to minimize the magnetic reluctance of the path around the conductor. Similar depositions of iron or nickel-iron can be used as in the top layer (i.e. layer 111 of say FIG. 4), with the effect being to enhance the field into the magnetic tape for a given current through the conductor. The combined effects of selectively putting iron above and below the conductor are particularly illustrated in FIGS. 5 and 6.

It should also be noted that a variety of other novel geometries could be made in a plane by use of the present invention. For instance, if some need existed to have two, three or more narrow magnetic fields coming into the magnetic tape within the width of a given conducting line, one could simply place short magnetic "bars" above or below the conductor to "modulate" the field geometries with much flexibility.

Figure 9:
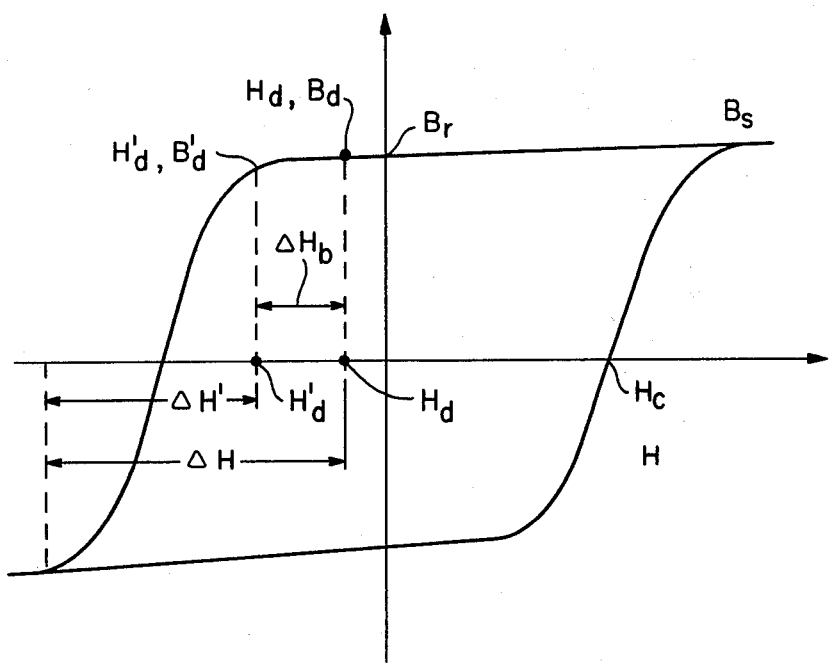
FIG. 9 graphically illustrates an alternative technique for the reductiion of recording current in a recording element which incorporates the technique of pre-biasing the magnetic medium by another (external) magnetic field.

Another method for reducing the recording current is to impose at the recording zone a biasing magnetic field on the magnetic medium in the same direction as the recording magnetic field. This method is particularly effective for magnetic mediums having a substantially high squareness ratio Br/Bs (remanence to saturation) and a high ratio of Hc/Br. FIG. 9 shows the effect of the magnetic biasing. After premagnetization of the magnetic medium, the demagnetization field effect sets the operating condition of the magnetic medium at the point identified as $H_d, B_d$. Imposition of the biasing magnetic field, $\Delta H_b$, defines a new operating condition identified as point $H'_d, B'_d$. As FIG. 9 indicates, the recording field $\Delta H'$ associated with the magnetic biasing is smaller than $\Delta H$, thus suggesting that the recording current under such a magnetic biasing condition can be smaller since $\Delta H$ is proportional to the recording current. Typically, for a $CrO_2$ magnetic medium it has been observed that a 20% reduction in the recording current can be achieved by imposing a biasing magnetic field of about 200 gauss.

One approach to reducing the recording current as discussed above may be seen in connection with FIGS. 2A and 2B. Material 102 may be a block of "semi-hard" magnetic material extended across the recording elements at the respective recording zones, geometrically configured as shown in FIGS. 2A and 2B. In operation, for each recording element an initial energization thereof of sufficient magnitude would locally magnetize this block of magnetizable material in the desired direction of magnetic field to effectively achieve the pre-biasing condition described. This initial energization could for example be performed at the factory, whereby each recording element of the entire head would be subjected to current level which would effectively provide an H field that saturates locally the piece of semi-hard magnetic material. Thus, in each subsequent energization of that same recording element the local pre-magnetization of this magnetic block of material will provide an augmenting magnetic field which would effectively provide the starting magnetic condition on such subsequent energizations as identified in FIG. 9 at point $H'_d, B'_d$. Thus, as shown in FIG. 9 only the reduced amount of recording current represented by $\Delta H_b$ would be needed to effect a satisfactory recording. It is to be noted that this pre-biasing magnetic field is of insufficient strength to effect by itself a recording on the magnetic medium.

What is claimed is:

1. A magnetic recording head formed using thin film metallization techniques for recording on a magnetizable medium responsive to a signal current applied to said head, and comprising:

a relatively flat, elongated conductor formed using said metallization techniques, said conductor having a reduced cross sectional area at a section of said conductor adjacent to said magnetizable medium and defining a recording zone thereat, said conductor having a first surface closest to said medium and a second surface furthest from said medium, and said current creating a magnetic field around said conductor which penetrates said medium and records thereon, and a magnetic shunt made of high permeability, high remanence material which is contiguous to said second surface of said conductor at said reduced cross sectional area, said shunt being placed in a remanent magnetized state by applying a first current of sufficient magnitude to said conductor prior to said signal current being applied thereto, said signal current never being of a magnitude to place said shunt in its remanent magnetic state, said shunt allowing more flux lines to be created around said conductor in the recording zone than elsewhere around said conductor away from said recording zone, and the remanent magnetic field from said magnetized shunt introducing a prebiasing magnetic field into said medium to assist in recording thereon but of itself not having a magnetic field strong enough to effect recording on said medium, thus allowing lower magnitude signal currents in order to record on said medium.

2. The invention in accordance with claim 1 further comprising a relatively flat magnetic shield made of high permeability material and located contiguous to the first surface of said flat conductor outside recording zone, said shield interacting with the magnetic field around said conductor created by said signal current in said conductor outside said recording zone to shield said last mentioned magnetic field from said medium outside recording zone but allowing said last mentioned field to penetrate said medium in said recording zone to record on said medium.

3. A multi-element magnetic recording head formed using thin film metallization techniques for recording on a magnetizable medium responsive to signal currents applied to said head, and comprising:

a plurality of flat, elongated conductors formed using said metallization techniques and arranged substantially parallel to each other, each conductor having a first surface closest to said medium and a second surface furthest from said medium, each said conductor having a reduced cross sectional area adjacent to said medium and defining a recording zone thereat, said area created by having less conductor material on said second side of each conductor, and said signal current in each conductor creating a magnetic field around the respective conductor which penetrates said medium and records thereon, and an elongated magnetic shunt made of high permeability, high remanence material oriented contiguous to the second surface of and crossing each conductor at its reduced cross sectional area, the portions of said shunt contiguous to the cross sectional area of each conductor being placed in a remanent magnetized state by applying a first current of sufficient magnitude to each of said conductors before said signal currents are applied thereto, with said signal currents never being of a magnitude to place said shunt in its remanent magnetic state, said shunt allowing more flux lines to be created around each of said conductors in their recording zone than elsewhere around each conductor away from said recording zone of each conductor, and the remanent magnetic field from said shunt in the recording zone of each conductor introducing a prebiasing magnetic field into said medium to assist in recording thereon but of itself not having a magnetic field strong enough to effect recording on said medium, thus allowing lower magnitude signal current in order to record on said medium.

4. The invention in accordance with claim 3 further comprising a relatively flat magnetic shield made of high permeability material located contiguous to the first surface of said conductors outside the recording zone of each conductor, said shield interacting with the magnetic field around each conductor outside the recording zone created by the signal current in each conductor to shield said last mentioned magnetic field from said medium but allowing the magnetic field created in said recording zone to penetrate said medium to record thereon.

* * * * *